United States Patent
Galbiati et al.

[11] Patent Number: 6,061,258
[45] Date of Patent: May 9, 2000

[54] MONITORING OF CURRENT IN AN INDUCTIVE LOAD, PWM DRIVEN THROUGH A BRIDGE STAGE

[75] Inventors: Ezio Galbiati, Agnadello; Alberto Salina, Limbiate, both of Italy

[73] Assignee: STMicroelectronics S.r.l., Agrate Brianza, Italy

[21] Appl. No.: 09/129,674

[22] Filed: Aug. 5, 1998

[30] Foreign Application Priority Data

Aug. 11, 1997 [EP] European Pat. Off. .............. 97830421

[51] Int. Cl.[7] ........................................................ H02M 3/24
[52] U.S. Cl. .................................. 363/98; 363/17; 363/56
[58] Field of Search ................................. 363/98, 17, 56

[56] References Cited

U.S. PATENT DOCUMENTS

| | | | |
|---|---|---|---|
| 3,586,878 | 6/1971 | Maxham | 327/37 |
| 5,341,286 | 8/1994 | Inoue et al. | 363/98 |
| 5,798,623 | 8/1998 | El-Sadi | 318/439 |

FOREIGN PATENT DOCUMENTS

| | | | |
|---|---|---|---|
| 0529366 A1 | 3/1993 | European Pat. Off. | H02M 3/335 |
| 0760552 A1 | 3/1997 | European Pat. Off. | H02M 7/5387 |

Primary Examiner—Edward H. Tso
Assistant Examiner—Gary L. Laxton
Attorney, Agent, or Firm—Theodore E. Galanthay; Allen, Dyer, Doppelt, Milbrath & Gilchrist, P.A.

[57] ABSTRACT

Monitoring of current flowing through an inductive load driven through a bridge power stage in a PWM mode, comprises sampling the signal output by a sensing amplifier with a Sample & Hold circuit including a sampling switch and a storing capacitor. The average value of the current in the load is monitored by sampling at a half way point of an active driving phase and at a half way point of a current recirculation phase by closing the switch with a synchronizing pulse that coincides with the half way points of these phases of operation. The monitoring uses a pair of complementary periodic reference signals and uses a sensing amplifier to amplify the signal existing on a current sensing resistor functionally connected in series with the load. This produces an amplified signal representative of the current in the load to be fed to an input of an error amplifier driving a power amplifier of the bridge stage. The synchronizing pulse is generated in coincidence with the peak and with the virtual zero crossing of the two reference periodic signals, out of phase from one another by 180 degrees. A two-input logic AND gate, combining the synchronizing pulse and a masking signal of a preestablished duration generated at every switching of the bridge stage may also be employed.

24 Claims, 6 Drawing Sheets

MONITORING OF CURRENT IN AN INDUCTIVE LOAD, PWM DRIVEN THROUGH A BRIDGE STAGE

FIELD OF APPLICATION

The present invention relates to a system for sensing a current flowing through an inductive load, such as, for example, a DC motor or a VCM (Voice Coil Motor) or a winding of a brushless motor, and the like, driven in a PWM mode by a bridge power stage including bipolar or MOSFET transistors.

BACKGROUND OF THE INVENTION

In European Patent Application No. 95830371.1-2207, filed on Aug. 31, 1995, and assigned to the present assignee, there is described a PWM driving system for an inductive actuator whose block diagram is shown in FIG. 1. The system comprises a control loop for the current flowing in an inductive load ($R_L$-$L_L$) with the power stage functioning in a PWM mode at a constant frequency.

The distinguishing feature of the illustrated system is that the current through the load is controlled by varying the duty-cycle of the two outputs (OUT+ and OUT-) of the POWER AMPLIFIER stage, and, more precisely, the condition of null current is obtained by driving the two outputs with two signals having the same frequency and a 50% duty cycle. By increasing the duty cycle of the output OUT+ and decreasing the duty cycle of the other output OUT-, or vice versa, the current through the load will circulate with a direction and intensity dependent on the difference of duty cycle difference between the two outputs.

The current sensing in this example is implemented by way of a sensing resistor Rs in series with the load. The voltage generated on this resistor is amplified by an operational amplifier SENSE AMPL. and is used as feedback input by the ERROR AMPL. to close the control loop. A critical point of this system is indeed the sensing of the current, and, more precisely, the generation of a voltage signal proportional to the mean value of the current that flows through the load. In fact, in this prior art system this is simply obtained through an operational amplifier with inputs fed a differential voltage on the order of hundred of millivolts. The voltage is represented by the voltage drop caused by the load current on the sensing resistor and a common mode voltage that goes from ground potential to the supply voltage Vp because the power stage functions in a PWM mode.

FIG. 2 shows the waveforms of the system described in the above cited patent application which show the relationships between the load current, the output voltage of the SENSE AMPL. and the two outputs OUT+ and OUT- of the power stage. It may be noticed that the output voltage of the SENSE AMPL. is perturbed by the switching of the two outputs of the power stage. Wishing to control the mean value of the current through the load, the gain and the passband of the current control loop must be limited in a manner to filter the noise existing on the output voltage of the SENSE AMPL. representing the feedback signal.

SUMMARY OF THE INVENTION

The object of the present invention is to sense the current flowing in an inductive load for generating a voltage signal proportional to the mean value of the current circulating in the load in such a way as to make it substantially immune to disturbances caused by the switchings of the outputs of the power stage.

The method of the present invention is based on a sampling technique synchronous with the PWM frequency of the power stage, to sample the current circulating in the load during precisely established instants distant from the switchings of the outputs OUT+ and OUT-. This generates a clean voltage signal which is desirable as the feedback signal for the current control loop.

The method of the invention includes sampling the output signal of a sensing amplifier by means of a sample & hold circuit comprising a sampling switch and a storing capacitance of the sampled value. The method also includes monitoring the mean value of the current through the load by effecting, according to a preferred embodiment, the sampling at exactly half way of the active driving phase and at half way of the current recirculation phase through the inductive load. This is done by closing the sampling switch by a synchronizing pulse coinciding with the half way points of these phases of operation.

More preferably, the closing of the sampling switch is commanded by the output of a logic AND gate, combining the synchronizing pulse and a masking signal, having a preestablished duration, generated at each switching of the bridge stage. This is done in order to ensure immunity to switching noise even under limit conditions of operation. Alternatively, the closing of the sampling switch may be effected by the same masking signal generated at each switching of the bridge stage, implementing a continuous sampling during the entire phase in which the masking signal remains at a logic one.

BRIEF DESCRIPTION OF THE DRAWINGS

The various aspects and advantages of the invention will become even more evident through the following description of several embodiments and by referring to the attached drawings, wherein.

DETAILED DESCRIPTION OF THE PREFERRED EMBODIMENTS

Figure 1:
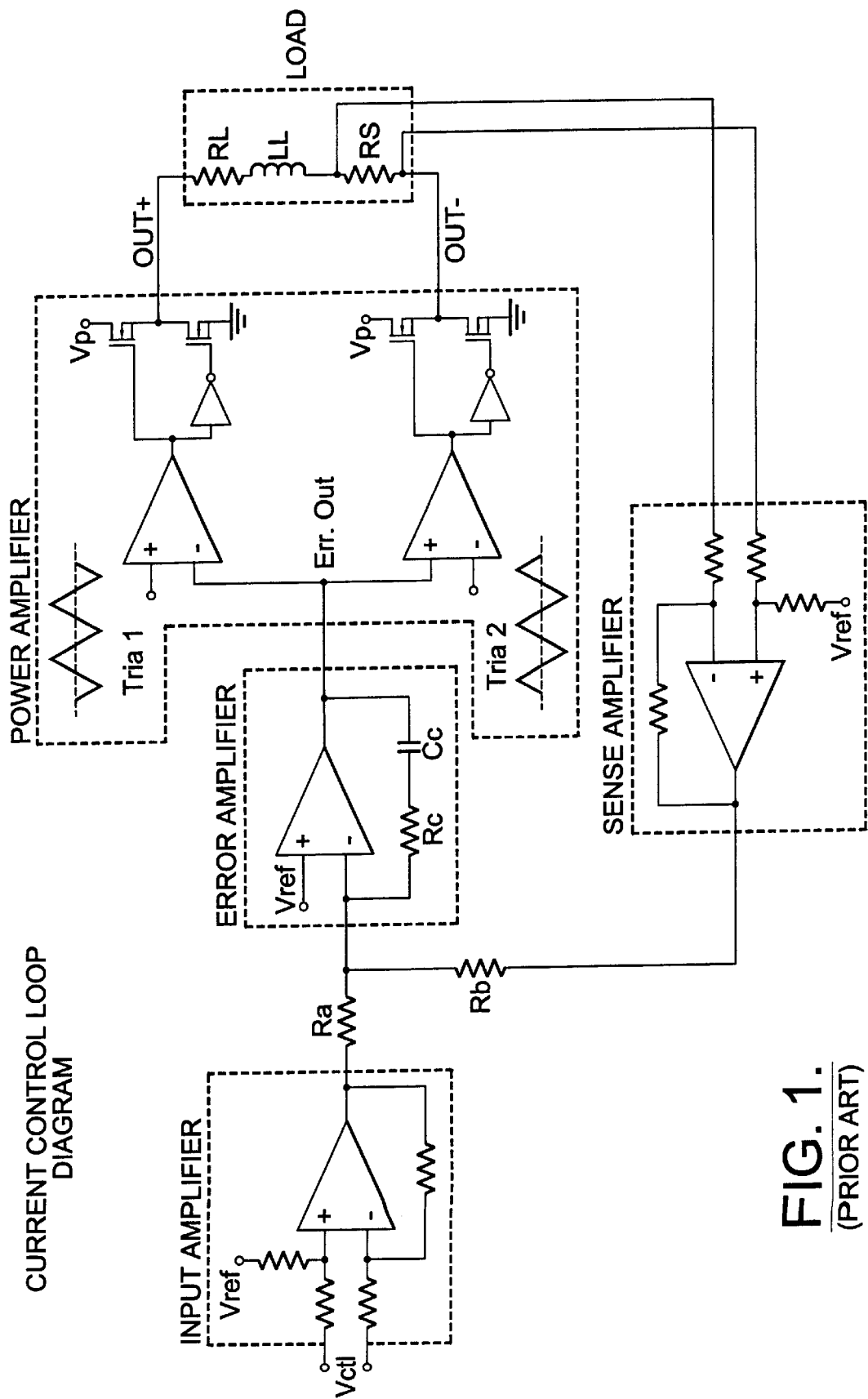
FIG. 1 shows a block diagram of a PWM current control loop, according to the prior art.
Figure 2:
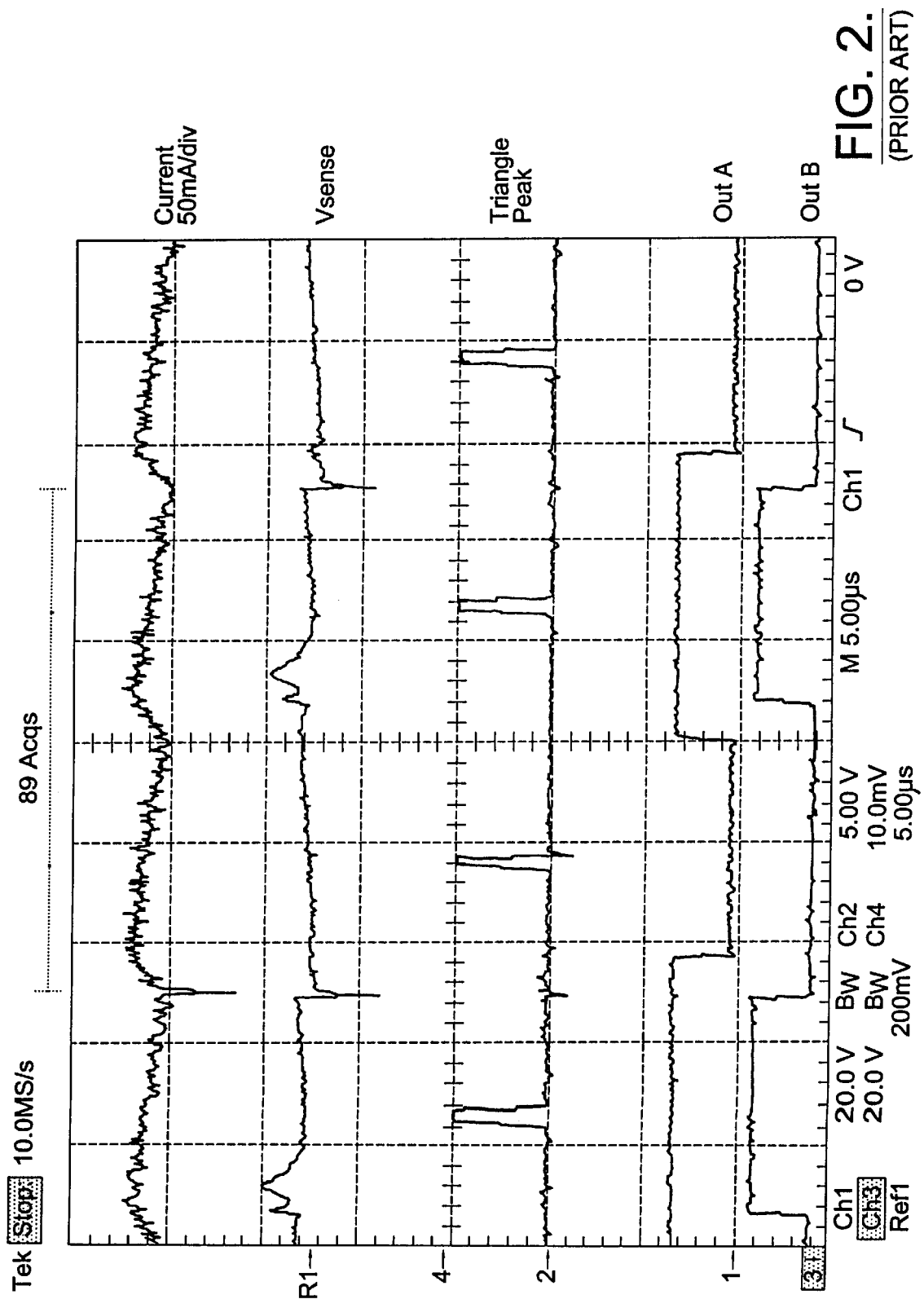
FIG. 2 shows the waveforms of the prior art circuit of FIG. 1.
Figure 3:
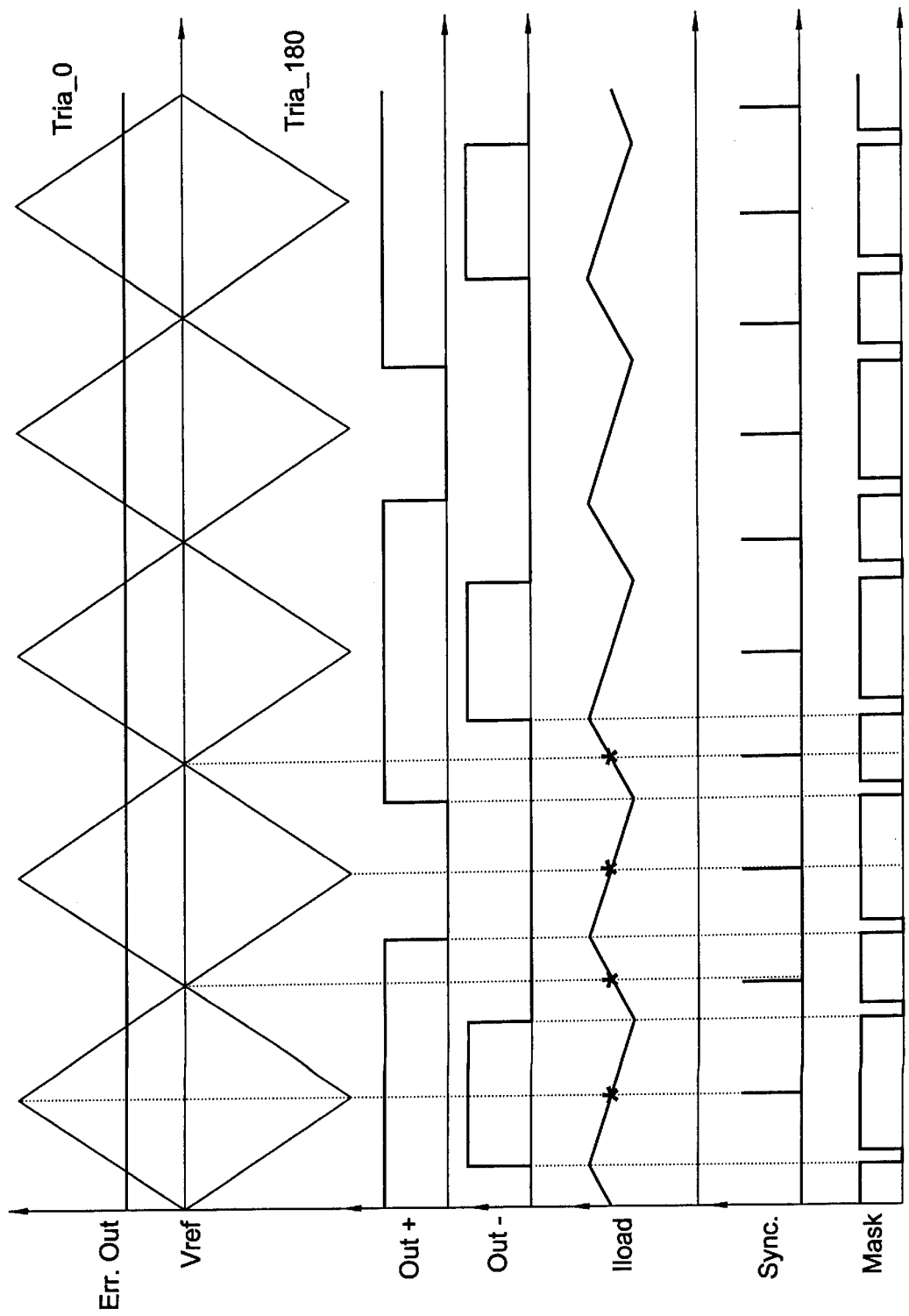
FIG. 3 is a timing diagram showing the waveforms relative to a PWM driving of a system like that of FIG. 1 and the logic signals needed to realize a synchronized sampling of the current through the load according to the method of the present invention.

FIG. 3 represents a timing diagram of the signals showing how the PWM driving of a bridge power stage is implemented. The signals driving the outputs of the power stage are generated by comparing the output signal (ERR. OUT) of the error amplifier (ERROR AMPL.) of the scheme of FIG. 1 with the two reference signals. In the considered example, the reference signals Tria_0 and Tria-180 are out of phase by 180 degrees from each other and have a triangular shape. Alternatively, these reference signals may be sinusoidal or of any other periodic form.

Of course, there is an active or driving phase during which the current increases when there is a voltage difference between OUT+ and OUT−, and a phase of recirculation when the two outputs are at the same voltage. By comparing the triangular-shaped reference signals with the output voltages of the power stage and the current through the load, it may be observed that the positive and negative peaks of the triangular-shaped reference signals correspond exactly to half of the duration of the recirculation phase of the current through the load. The virtual zero crossing (Vref) of the same corresponds to half of the active driving phase of the current through the load. Therefore, by realizing current sensing circuitry for the current through the load being capable of sampling the current level at these two instants as just described, a voltage signal that is proportional to the average value of the current through the load is obtained that is not influenced by noise caused by switchings of the power stage outputs.

FIG. 3 shows a pulse signal Sync that is normally generated every time the reference signals (be they triangular or of any other form) Tria_0 and Tria_180 cross the virtual zero and at every consequent negative or positive peak. This Sync signal may thus be also used for synchronizing the circuit that realizes a sample & hold sampling of the load current shown in FIG. 4.

Figure 4:
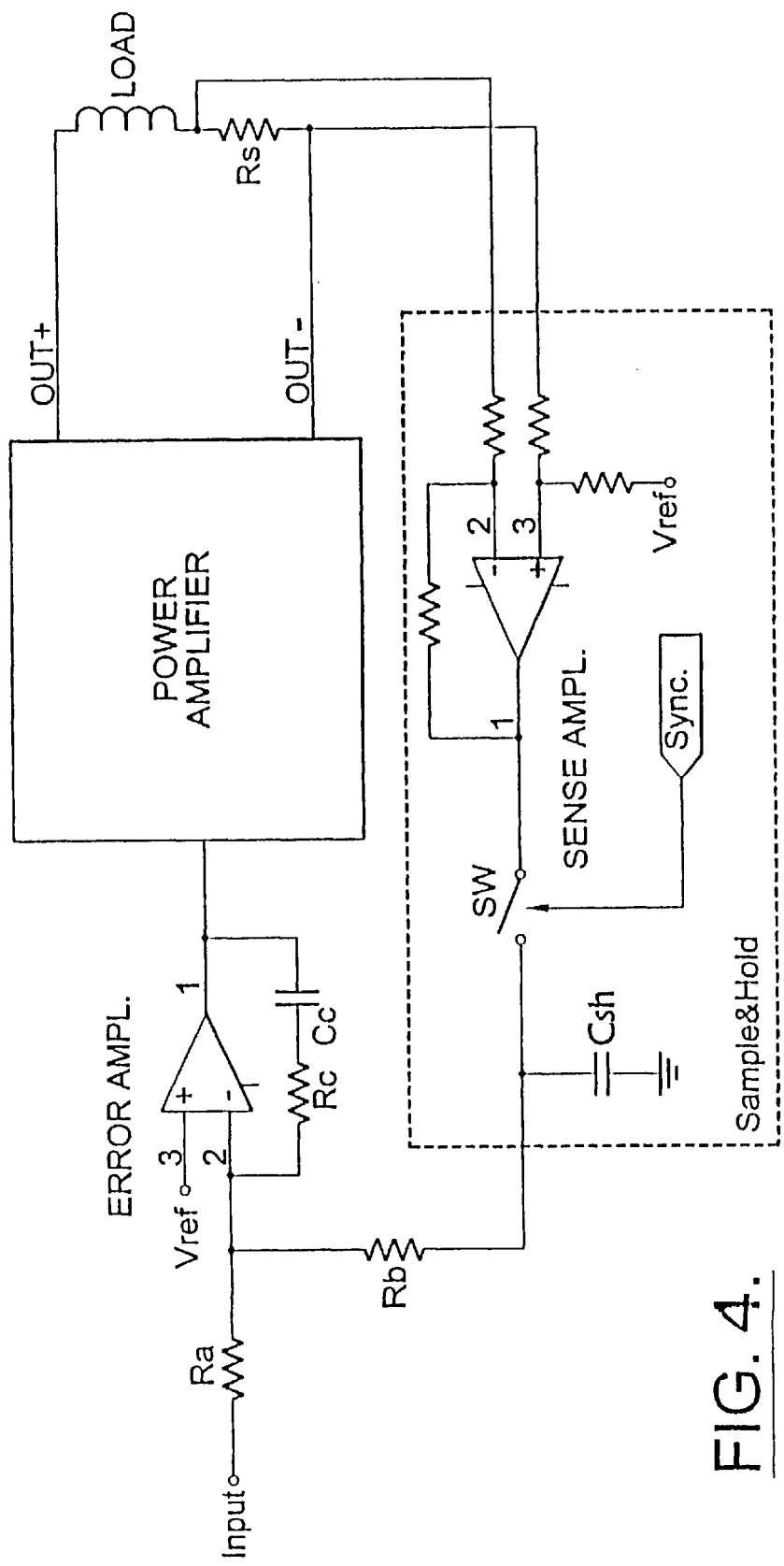
FIG. 4 is a block diagram of the PWM current control loop comprising a current sampling block according to the present invention.

The block diagram of FIG. 4 comprises a first stage including an operational amplifier SENSE AMPL. which differentially receives at its inputs the voltage drop determined by the current crossing the sensing resistor Rs. The output of this operational amplifier is a voltage proportional to the value of the current Iload that flows through the load, though influenced by spurious voltage peaks caused by the switchings of the power stage.

The switch SW of the Sample & Hold block, identified by the dashed line block in the figures, coupled in series between the output of the operational amplifier and the capacitor Csh, is driven by the synchronizing signal Sync. This signal transfers and maintains the voltage level existing at the output of the operational amplifier by charging the capacitor Csh. Hence, by sampling every time at the middle of the active driving phase and at the middle of the recirculation phase of the current load through the load, intrinsically far from the switching instants of the outputs of the power stage, the output of the Sample & Hold block is a noise free voltage proportional to the average value of the current through the load.

In these embodiments the system is not immune to the noise generated by the switchings of the power stage under any condition of operation. Indeed, if the active phase or the recirculation phase of the current becomes exceptionally short, for example, when the duty-cycle of the current ripple approaches 0% or 100%, it is possible that the output voltage of the operational amplifier, which senses the current through the load may be read when a transient generated by the switching of an output of the power stage has not decayed completely. Therefore, the output of the Sample & Hold block may have a voltage influenced by noise generated by the output switchings. To overcome this potential shortcoming and ensure immunity to noise under these extreme conditions of operation, a Mask signal is generated every time a switching of any of the power stage outputs takes place.

Figure 5:
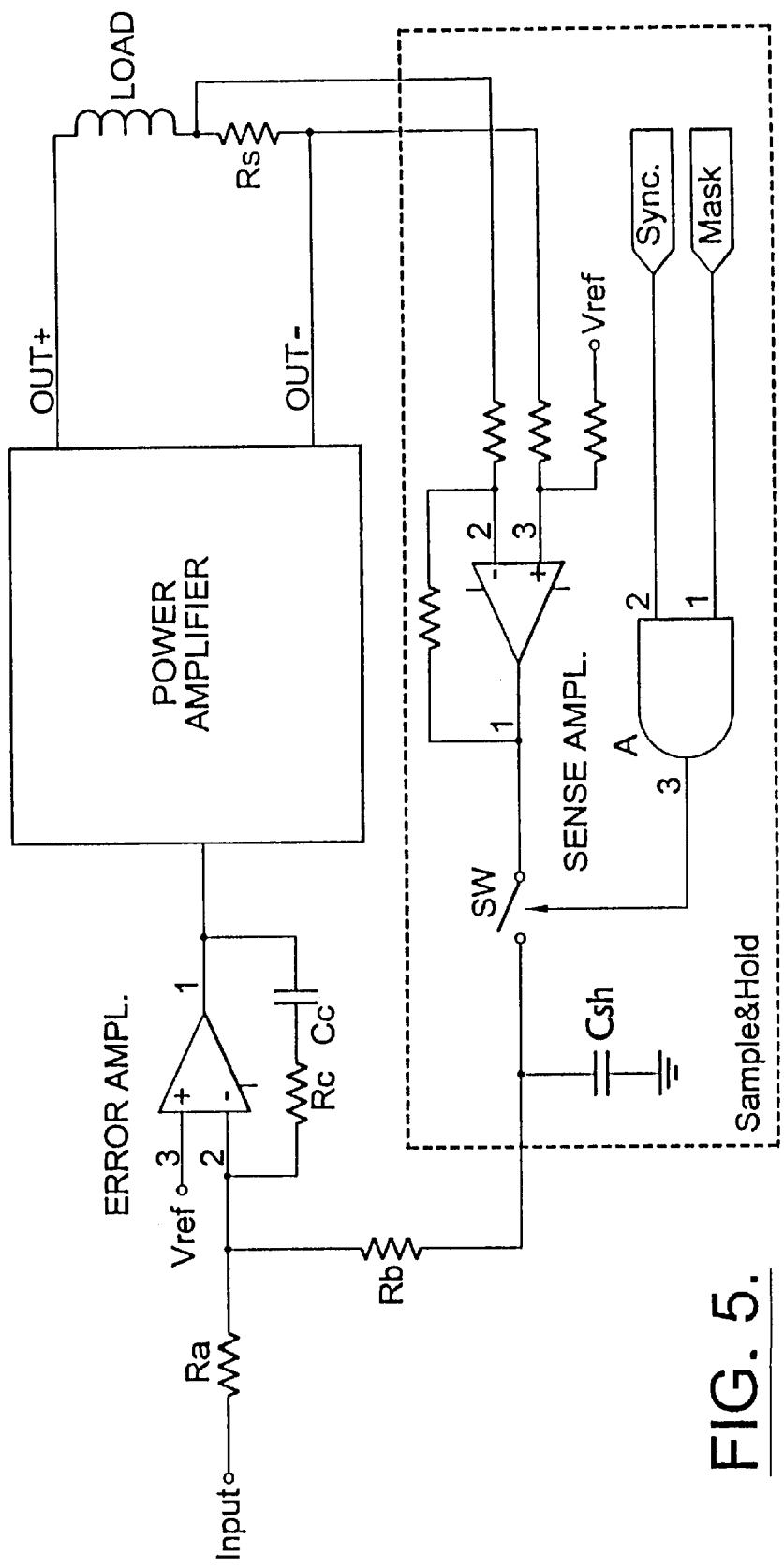
FIG. 5 is a scheme similar to that of FIG. 4 wherein a masking process for the noise existing on the output of the SENSE AMPL. caused by the switchings of the power stage is implemented.
Figure 6:
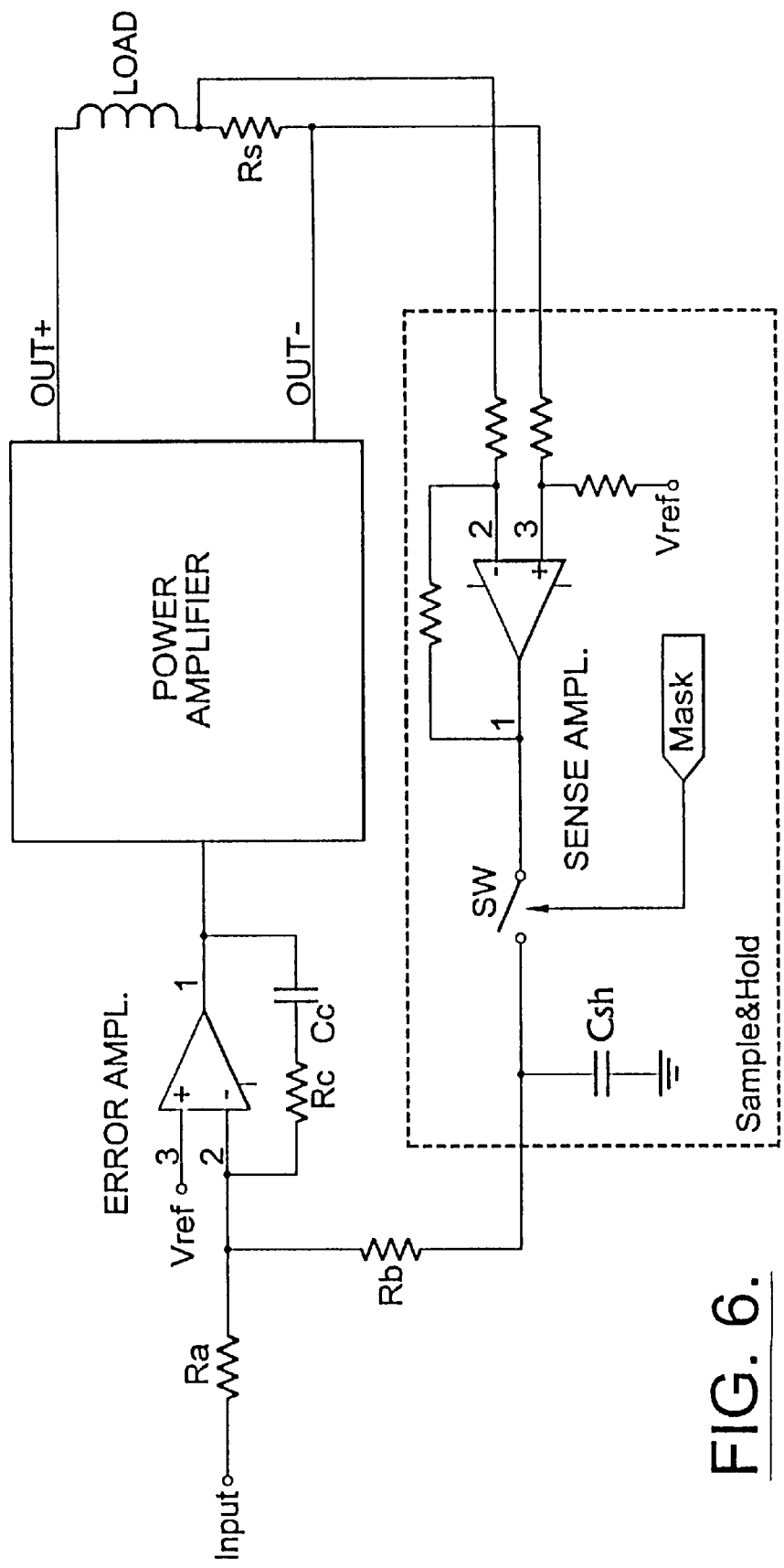
FIG. 6 is a scheme similar to that of FIG. 4 wherein the closing of the switch SW for sampling the current through the load is effected by means of a masking signal.

This Mask signal is also represented in the diagrams of FIG. 3 and has a duration that is slightly longer than that of the disturbances superimposed on the output voltage of the SENSE AMPL. caused by switchings of the output stage. In the alternative embodiment scheme of FIG. 5 there is shown a way such a masking signal is used to overcome the above noted drawbacks.

By ANDing the MASK pulse with the synchronizing pulse Sync of the sampling of the current, an output signal is obtained which will be forced to zero for the whole duration of the masking signal. It will be equal to the synchronizing signal for the remaining time. By using the logic AND output to control the closing of the SW switch the sampling of the current is disabled for a predefined time every time one of the outputs of the power stage switches.

In this way, when the active phase of the current through the load has a duration shorter than that of the masking time, the current sampling is not carried out during such a phase, but is effected only during the recirculation phase. Similarly, when the current recirculation phase has a duration shorter than that of the masking time, the sampling is not effected during the recirculation phase, rather it is carried out only during the active phase.

In this way, the sampling of the value of the current through the load by closing the switch of Sample & Hold block, is done only at instants when the output voltage of the sense amplifier is not affected by noise caused by the switchings of the PWM output stage. This produces a noise free voltage signal proportional to the average value of the current through the load to be used as a feedback signal by the control loop for the current.

A third alternative embodiment includes sampling the current through the load by reading the SENSE AMPLIFIER output, by using only the Mask signal to close the SW switch. In this way, with regard to the preceding case in which the current is sampled at exactly the half way point of the active phase and half way point of the recirculation phase, the switch SW that transfers the output voltage of the sense amplifier onto the capacitor Csh remains closed for the whole duration in which the masking signal is at a high logic level. The switch is opened only to mask the transient disturbances caused by the switchings of the power stage for a duration in which the same signal is at a low logic level.

The voltage signal obtained at the Sample & Hold block output, is a signal transparent to the sense amplifier output for the whole duration in which the masking signal is at a high logic level, following in this way the trend of the current through the load instant by instant. During the phase in which the masking signal is at a low logic level, this signal keeps the voltage level that existed before the opening of the SW switch, ensuring a signal free of disturbances present at the SENSE AMPLIFIER output.

That which is claimed is:

1. A method of monitoring current flowing through an inductive load driven through a bridge power stage in a pulse width modulation (PWM) mode, the method comprising the steps of:

amplifying by a sensing amplifier a signal existing on a current sensing resistor functionally connected in series with the inductive load to produce an amplified signal representative of the current in the inductive load;

feeding the amplified signal to an input of an error amplifier for driving a power amplifier of the bridge power stage;

sampling the amplified signal from the sensing amplifier using a sample and hold circuit comprising a sampling switch and a storing capacitor; and monitoring an average value of current in the inductive load by sampling at a half way instant of an active driving phase and at a half way instant of a current recirculation phase by closing the sampling switch based upon a synchronizing pulse that coincides with the half way instants of the active driving and current recirculation phases.

2. A method according to claim 1, wherein the synchronizing pulse is a pulse generated in coincidence with a peak and with a virtual zero crossing of two periodic reference signals out of phase by 180 degrees from one another.

3. A method according to claim 2, further comprising the step of controlling closing of the sampling switch by an output of a two-input logic AND gate combining the synchronizing pulse and a masking signal of a preestablished duration generated at every switching of the bridge power stage.

4. A method according to claim 1, further comprising the step of controlling closing of the sampling switch by a masking signal having a preestablished duration and being generated at every switching of the bridge power stage.

5. A method of monitoring current flowing through an inductive load driven through a bridge power stage in a pulse width modulation (PWM) mode, the method comprising the steps of:
amplifying by a sensing amplifier a signal existing on a current sensing resistor functionally connected in series with the inductive load to produce an amplified signal representative of the current in the inductive load;
sampling the amplified signal from the sensing amplifier using a sample and hold circuit comprising a sampling switch and a storing capacitor; and
monitoring a value of current in the inductive load by sampling at a preestablished instant spaced in time from switchings of the bridge power stage to avoid disturbances caused by switchings of the bridge power stage.

6. A method according to claim 5, further comprising the step of controlling closing of the sampling switch by a masking signal having a preestablished duration and being generated at every switching of the bridge power stage.

7. A method according to claim 5, wherein the step of sampling at preestablished instants comprises sampling at preestablished instants to thereby monitor an average value of current in the inductive load.

8. A method according to claim 5, wherein the step of sampling at preestablished instants comprises monitoring at half way instants of an active driving phase and at half way instants of a current recirculation phase by closing the sampling switch based upon a synchronizing pulse that coincides with the half way instants of the active driving and current recirculation phases.

9. A method according to claim 8, wherein the synchronizing pulse is generated in coincidence with a peak and with a virtual zero crossing of two periodic reference signals out of phase by 180 degrees from one another.

10. A method according to claim 9, further comprising the step of controlling closing of the sampling switch by an output of a two-input logic AND gate combining the synchronizing pulse and a masking signal of a preestablished duration generated at every switching of the bridge power stage.

11. A method of monitoring current flowing through an inductive load driven through a bridge power stage in a pulse width modulation (PWM) mode, the method comprising the steps of:
amplifying by a sensing amplifier a signal existing on a current sensing resistor functionally connected in series with the inductive load to produce an amplified signal representative of the current in the inductive load;
sampling the amplified signal from the sensing amplifier using a sample and hold circuit comprising a sampling switch and a storing capacitor;
monitoring an average value of current in the inductive load by sampling at a preestablished instant during at least one operating phase of the bridge power stage spaced in time from switchings of the bridge power stage to avoid disturbances caused by switchings of the bridge power stage; and
controlling closing of the sampling switch by a masking signal having a preestablished duration and being generated at every switching of the bridge power stage.

12. A method according to claim 11, wherein the step of sampling at preestablished instants comprises monitoring at half way instants of an active driving phase and at half way instants of a current recirculation phase by closing the sampling switch based upon a synchronizing pulse that coincides with the half way instants of the active driving and current recirculation phases.

13. A method according to claim 12, wherein the synchronizing pulse is generated in coincidence with a peak and with a virtual zero crossing of two periodic reference signals out of phase by 180 degrees from one another.

14. A method according to claim 13, further comprising the step of controlling closing of the sampling switch by an output of a two-input logic AND gate combining the synchronizing pulse and the masking signal.

15. A method according to claim 11, wherein the at least one operating phase comprises at least one of an active driving phase and a current recirculation phase.

16. A method according to claim 11, wherein the at least one operating phase comprises an active driving phase and a current recirculation phase.

17. A system for monitoring the current flowing through an inductive load being supplied from a bridge power stage operable in a pulse width modulation (PWM) mode, the system comprising:
a sensing resistor functionally connected in series with the inductive load;
a sensing amplifier having an input connected to receive a signal present on said sensing resistor and having an output producing a signal representative of the current in the inductive load;
an error amplifier having an input coupled to the output of said sensing amplifier and to a reference signal and having an output coupled to the bridge power stage;
a sample and hold circuit functionally connected to the output of said sensing amplifier and comprising a sampling switch and a storing capacitor; and
a synchronization circuit for generating a synchronization signal for closing said sampling switch during at least one of an active driving phase of forcing a driving current through the inductive load and a recirculation phase of current in the inductive load, spaced in time from switching instants of the bridge power stage to avoid disturbances caused by switchings of the bridge power stage.

18. A system according to claim 17, wherein the synchronization signal is a pulse generated in coincidence with a peak and with a virtual zero crossing of two reference periodic signals out of phase by 180 degrees from one another.

19. A system according to claim 18, further comprising a masking signal generator for generating a masking signal having a preestablished duration at switching instants of the bridge power stage; and wherein said synchronization circuit comprises a two input AND gate combining the synchronization pulse and the masking signal and having an output to control said sampling switch.

20. A system according to claim 17, further comprising a masking signal generator for generating a masking signal having a preestablished duration at switching instants of the bridge power stage; and wherein said masking signal controls said sampling switch.

21. A system for supplying power to an inductive load comprising:

- a bridge power stage connected to the inductive load and operable in a pulse width modulation (PWM) mode;
- a sensing resistor functionally connected in series with the inductive load;
- a sensing amplifier having an input connected to receive a signal present on said sensing resistor and having an output producing a signal representative of the current in the inductive load;
- an error amplifier having an input coupled to the output of said sensing amplifier and to a reference signal and having an output coupled to said bridge power stage;
- a sample and hold circuit functionally connected to the output of said sensing amplifier and comprising a sampling switch and a storing capacitor; and
- a synchronization circuit for generating a synchronization signal for closing said sampling switch during at least one of an active driving phase of forcing a driving current through the inductive load and a recirculation phase of current in the inductive load, spaced in time from switching instants of the bridge power stage to avoid disturbances caused by switchings of the bridge power stage.

22. A system according to claim 21, wherein the synchronization signal is a pulse generated in coincidence with a peak and with a virtual zero crossing of two reference periodic signals out of phase by 180 degrees from one another.

23. A system according to claim 22, further comprising a masking signal generator for generating a masking signal having a preestablished duration at switching instants of the bridge power stage; and wherein said synchronization circuit comprises a two input AND gate combining the synchronization pulse and the masking signal and having an output to control said sampling switch.

24. A system according to claim 21, further comprising a masking signal generator for generating a masking signal having a preestablished duration at switching instants of the bridge power stage; and wherein said masking signal controls said sampling switch.

* * * * *